US005691785A

United States Patent [19]
Usui et al.

[11] Patent Number: 5,691,785
[45] Date of Patent: Nov. 25, 1997

[54] COLOR PROJECTION TYPE DISPLAY APPARATUS HAVING THREE LIQUID DISPLAYS OF SAME STRUCTURE

[75] Inventors: Masahiro Usui; Hiroshi Kida; Shinsuke Shikama; Mitsushige Kondo, all of Nagaokakyo, Japan

[73] Assignee: Mitsubishi Denki Kabushiki Kaisha, Tokyo, Japan

[21] Appl. No.: 659,562

[22] Filed: Jun. 10, 1996

Related U.S. Application Data

[62] Division of Ser. No. 203,607, Feb. 28, 1994, Pat. No. 5,570,209, which is a continuation of Ser. No. 760,927, Sep. 17, 1991, abandoned.

[30] Foreign Application Priority Data

| Sep. 18, 1990 | [JP] | Japan | 2-250494 |
| Sep. 18, 1990 | [JP] | Japan | 2-250495 |
| Sep. 20, 1990 | [JP] | Japan | 2-252564 |

[51] Int. Cl.$^6$ ............................ G02F 1/1335; H04N 9/31
[52] U.S. Cl. .......................... 349/8; 349/102; 349/117
[58] Field of Search ........................ 359/48, 49, 40, 359/41, 63, 485, 495, 496; 353/31, 34, 122; 349/8, 5, 9, 57, 102, 117

[56] References Cited

U.S. PATENT DOCUMENTS

| 4,231,640 | 11/1980 | Funada et al. | 359/87 |
| 4,913,529 | 4/1990 | Goldenberg et al. | 359/496 |
| 4,989,076 | 1/1991 | Owada et al. | 359/63 |
| 5,073,830 | 12/1991 | Loucks | 359/495 |
| 5,097,323 | 3/1992 | Sato et al. | 359/70 |
| 5,153,752 | 10/1992 | Kurematsu et al. | 359/41 |
| 5,157,523 | 10/1992 | Yamagishi et al. | 359/41 |
| 5,200,843 | 4/1993 | Karasawa et al. | 359/40 |
| 5,299,036 | 3/1994 | Nicolas et al. | 359/41 |
| 5,387,991 | 2/1995 | Mitsutake et al. | 359/70 |

FOREIGN PATENT DOCUMENTS

| 61-102626 | 5/1986 | Japan | 359/48 |
| 61-90584 | 5/1986 | Japan . |
| 62-133424 | 6/1987 | Japan . |
| 1-102428 | 4/1989 | Japan . |
| 2-12192 | 1/1990 | Japan . |
| 3-150525 | 6/1991 | Japan . |
| 3-221917 | 9/1991 | Japan . |

*Primary Examiner*—William L. Sikes
*Assistant Examiner*—Tai V. Duong

[57] ABSTRACT

The present invention provides a color projector utilizing three liquid crystal display elements. The natural light is separated into illuminating rays of red, green and blue colors by a dichroic mirror, each of these illuminating rays being used to illuminate the corresponding one of the liquid crystal display elements. Each of the liquid crystal display elements is controlled by a desired image signal with respect to its transmittance at each pixel. After passed through the liquid crystal display elements, three kinds of colored illuminating rays are again synthesized by the other dichroic mirror to form a light beam which in turn is enlarged and projected by a projecting lens on a screen. By providing light source means including means for converting the natural light into the linearly polarized beam, the illuminating rays may have their polarizing angles coincide with each other without any loss of light. As the linearly polarized beam is reflected by the mirror system, the illuminating rays of red, green and blue colors are changed with respect to their polarizing angels. Depending on the changed polarizing angles, the polarizing angle of the light rays incident on each of the liquid crystal display elements may be adjusted to remove any loss of light.

5 Claims, 10 Drawing Sheets

COLOR PROJECTION TYPE DISPLAY APPARATUS HAVING THREE LIQUID DISPLAYS OF SAME STRUCTURE

This application is a divisional of application Ser. No. 08/203,607 filed on Feb. 28, 1994, now U.S. Pat. No. 5,570,209, which is a Rule 62 Continuation of application Ser. No. 07/760,927, filed Sep. 17, 1991, now abandoned, the entire contents of which are hereby incorporated by reference.

BACKGROUND OF THE INVENTION

1. Field of the Invention

The present invention relates to a projection type display apparatus and more particularly to a liquid crystal projector which has an increased luminance and which is of a simplified structure produced with a reduced cost.

2. Description of the Related Art

FIG. 10 shows an optical system in a projection type display system constructed in accordance with the prior art. The optical system comprises a source of white light 1; a parabolic mirror 2 for converting the rays emitted from the light source 1 into parallel rays; dichroic mirrors 11a, 11b, 14a and 14b each for reflecting rays ranged in a specific region of wavelength; reflective mirrors 12 and 13; transmission type liquid crystal display elements 17a, 17b and 17c each including two polarizing plates 15a, 15b and a liquid crystal cell 16 sandwiched between the polarizing plates; and a projecting lens 19 for enlarging and projecting images from the respective liquid crystal display elements 17 onto a screen 20.

On operation, rays emitted from the source of white light 1 are converted into parallel rays by the parabolic mirror 2, the parallel rays entering two dichroic mirrors 11a and 11b. At these dichroic mirrors 11a and 11b, the parallel white rays are separated into rays 7a, 7b and 7c of three colors R, G and B. These rays 7a, 7b and 7c illuminate the liquid crystal display elements 17a, 17b and 17c, respectively. In FIG. 10, each of the liquid crystal display elements 17 has a rectangular imaging face which is of a ratio of vertical side to horizontal side or aspect ratio equal to 3:4 for NTSC system or 9:16 for HDTV (High Definition TV) system. Images of colors R, G and B are synthesized at the dichroic mirrors 14a and 14b. The synthesized image is enlarged and projected by the projecting lens 19 onto the screen 20.

In such an arrangement of the prior art, the light emitted from the light source 1 is the natural light which is randomly variable in direction of output wavefront. Thus, polarizing components of the emitted beam 7 in a direction perpendicular to the direction of output wavefront in the entrance-side polarizing plate 15a will be absorbed by this polarizing plate 15a in the liquid crystal display element 17. Such an absorption results in loss in the projector. Theoretically, half of the light rays are lost at the entrance-side polarizing plate 15a. This is an obstacle to provision of a high-luminance projected image. The power of light absorbed by the polarizing plate 15a may increase it in temperature, leading to degradation of the selectivity of polarization.

The present invention is directed to overcome the aforementioned problems in the prior art.

It is therefore an object of the present invention to provide a projection type display apparatus which can realize a liquid crystal projector for projecting high-luminance images.

SUMMARY OF THE INVENTION

In one aspect of the present invention, a projection type display apparatus utilizes a light beam linearly polarized from the natural light as an illuminating light for three liquid crystal display elements through which light rays separated into the respective colors R, G and B pass, one of these liquid crystal display elements having a direction of output wavefront different from those of the remaining liquid crystal display elements. Thus, the entrance-side polarizing angles of all the liquid crystal display elements can coincide with the axes of polarization in the illuminating rays and cause all the light rays to pass therethrough without any loss.

More particularly, the polarizing plate of each of the liquid crystal display elements has a direction of output wavefront separately set to deal with variations of the direction of output wavefront due to the reflection at any mirror on the optical path. As a result, loss at the entrance-side polarizing plate of each liquid crystal display element can be reduced to provide a projected image with an increased luminance. This also reduces the generation of heat at the polarizing plate due to loss of light.

In the second aspect of the present invention, a projection type display apparatus utilizes a light beam linearly polarized from the natural light as an illuminating light for three liquid crystal display elements, the three liquid crystal display elements arranged to have the same direction of output wavefront, one or two of the liquid crystal display elements being disposed behind a phase plate for rotating the plane of polarization.

In such an arrangement, the linearly polarized light is used as the illuminating light. Thus, the loss at the entrance-side polarizing plate of each of the liquid crystal display elements can be reduced to provide a projected image with an increased luminance, as in the first aspect of the present invention. This also reduces the generation of heat at the polarizing plate due to loss of light. The phase plate disposed before the liquid crystal display element(s) functions to rotate the plane of polarization in the incident light such that the plane of polarization will be aligned with the direction of output wavefront in the entrance-side polarizing plate. Unlike the arrangement according to the first aspect of the present invention, thus, the three liquid crystal display elements can be of the same structure.

In the third aspect of the present invention, a projection type display apparatus comprises three liquid crystal display elements having the same structure wherein the direction of output wavefront in the entrance-side polarizing plate of a liquid crystal display element is perpendicular or parallel to the longitudinal axis of its liquid crystal displaying face.

Consequently, the directions of polarization in the entrance-side polarizing plates of the three liquid crystal display elements can be caused to coincide with the direction of output wavefront in the illuminating light by arranging the light source for generating a light beam linearly polarized from the natural light and which is used to illuminate the liquid crystal display elements such that the axis of polarization in that light source will be parallel or perpendicular to the liquid crystal displaying face.

Although the projection type display apparatus according to the third aspect of the present invention utilizes a linearly polarized light as a source of illumination and comprises three liquid crystal display elements of the same structure in which the direction of output wavefront is parallel or perpendicular to the longitudinal axis of the rectangular displaying section, the loss at the entrance-side polarizing plate of each of the liquid crystal display elements may be reduced to provide a projected image with an increased luminance.

More particularly, the first and second features of the present invention provide an entrance-side polarizing plate having a direction of output wavefront which is angled at 45 degrees relative to the horizontal direction. If a liquid crystal display element having such a direction of output wavefront is used, it is required that an illuminating light also has its direction of output wavefront which is inclined at 45 degrees relative to the horizontal direction. However, the direction of output wavefront in the illuminating light will be rotated by 90 degrees each time when the illuminating light is reflected by a mirror along the optical path. With a liquid crystal display element having its direction of output wavefront inclined by 45 degrees as in the first feature of the present invention, thus, only one of three similar liquid crystal display elements corresponding to three colors R, G and B may have a polarizing plate having its direction of polarization which is inclined opposite to those of the remaining liquid crystal display elements.

In the second feature of the present invention, further, the use of any means for rotating the plane of polarization such as phase plate or the like is preferred to rotate the plane of polarization in the illumination light. However, if only one liquid crystal display element having an entrance-side polarizing plate with its direction of output wavefront inclined by an angle different from those of the other liquid crystal display elements through 90 degrees as in the first feature of the present invention, the manufacturing cost of the liquid crystal display elements will be increased. If the means for rotating the plane of polarization is taken as in the second feature of the present invention, a specific optical element is required, this also increasing the manufacturing cost.

The third feature of the present invention can overcome the aforementioned problems in the first and second features of the present invention and provide a projection type display apparatus which can be simplified in construction with a reduced cost.

BRIEF DESCRIPTION OF THE INVENTION

Figure 8:
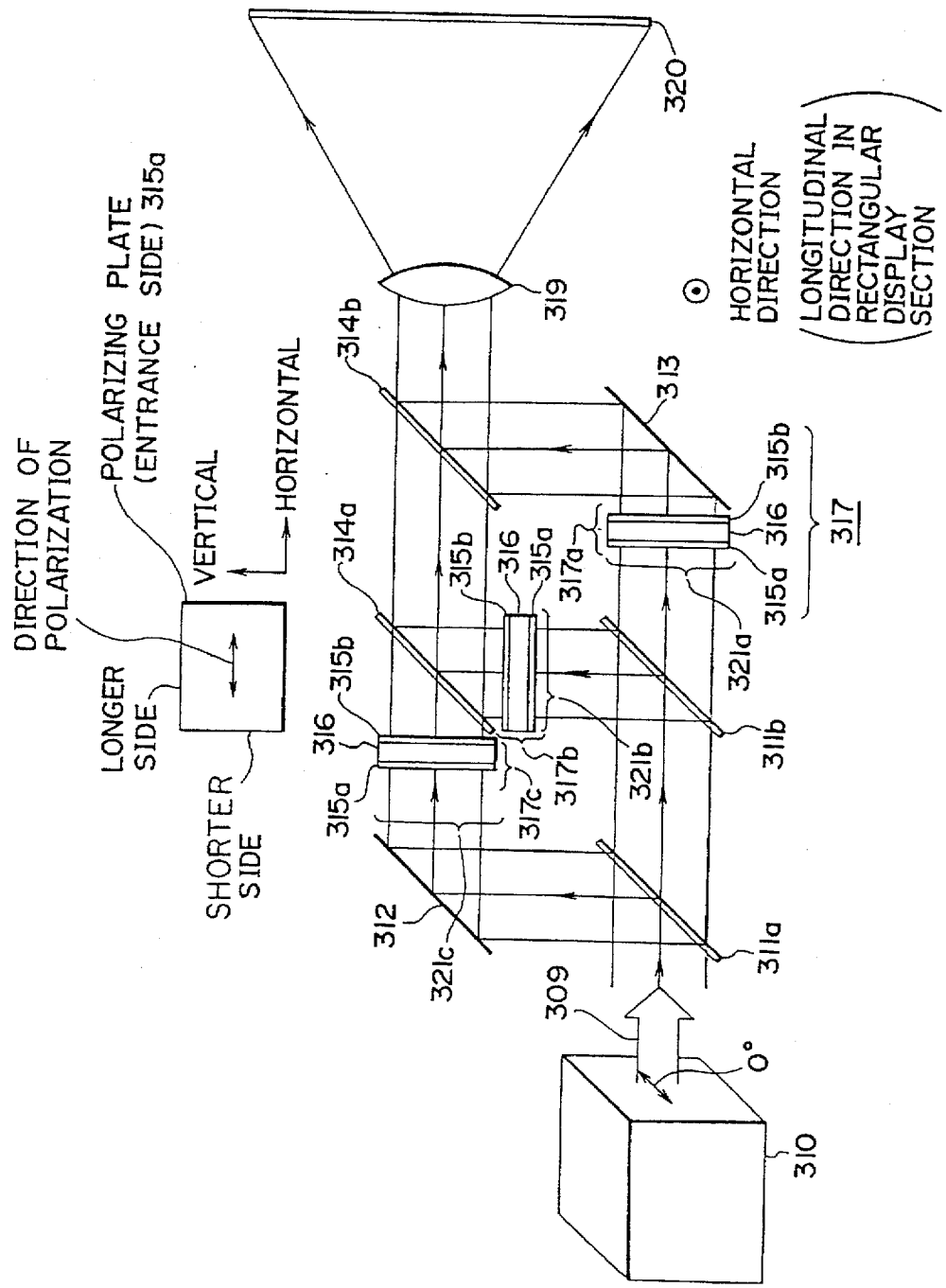

FIG. 8 is a view of the fourth preferred embodiment of a projection type display apparatus constructed in accordance with the present invention, illustrating three liquid crystal display elements and a source of light having their polarizing angles which are set to be horizontal, the fourth embodiment being capable of omitting phase plates used in the previous embodiments and instead using three polarizing plates having the same direction of polarization.

Figure 9:
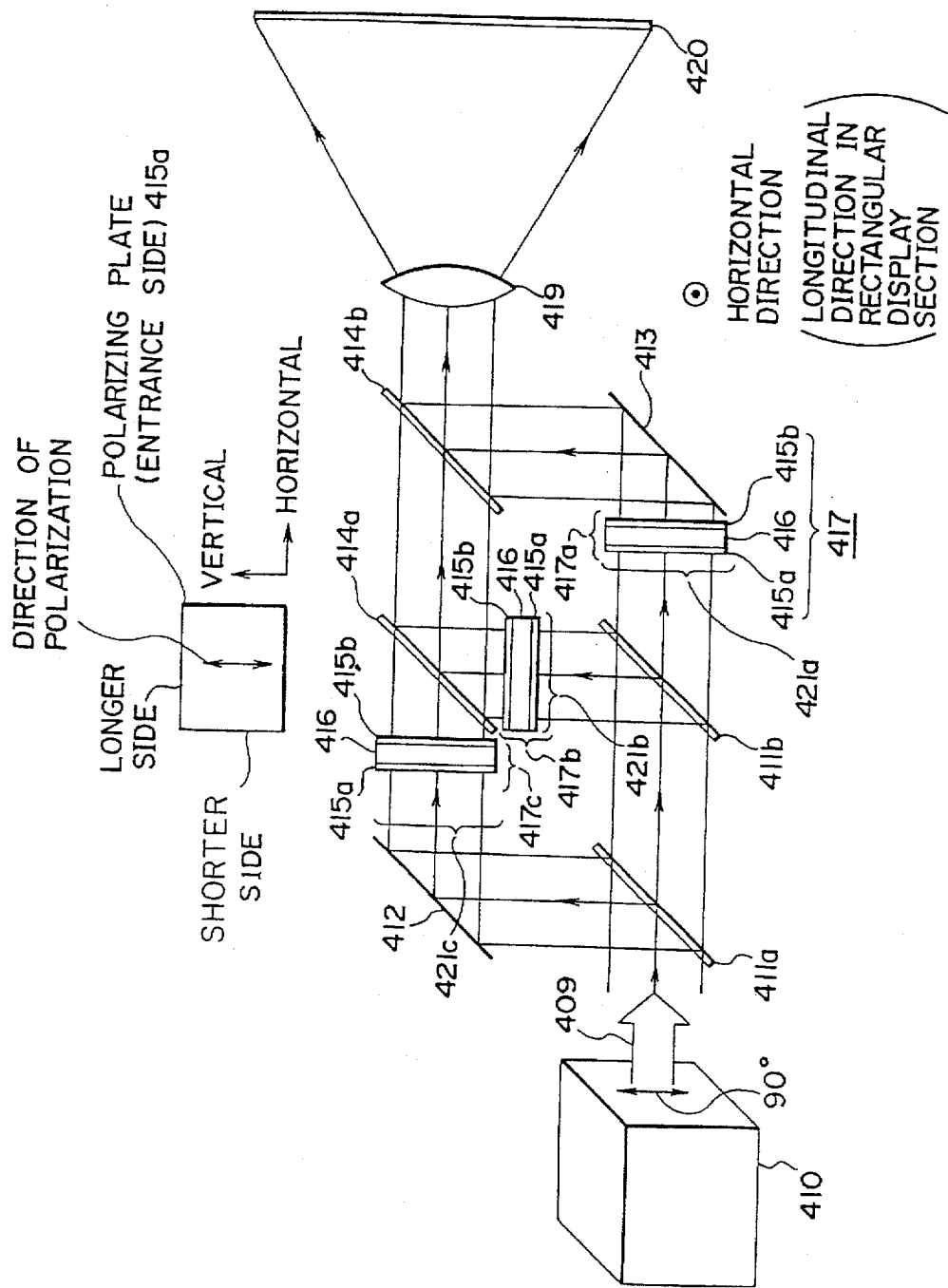

FIG. 9 is a view of the fifth preferred embodiment of a projection type display apparatus constructed in accordance with the present invention, illustrating three liquid crystal display elements and a source of light which have their polarizing angles set to be vertical.

Figure 10:
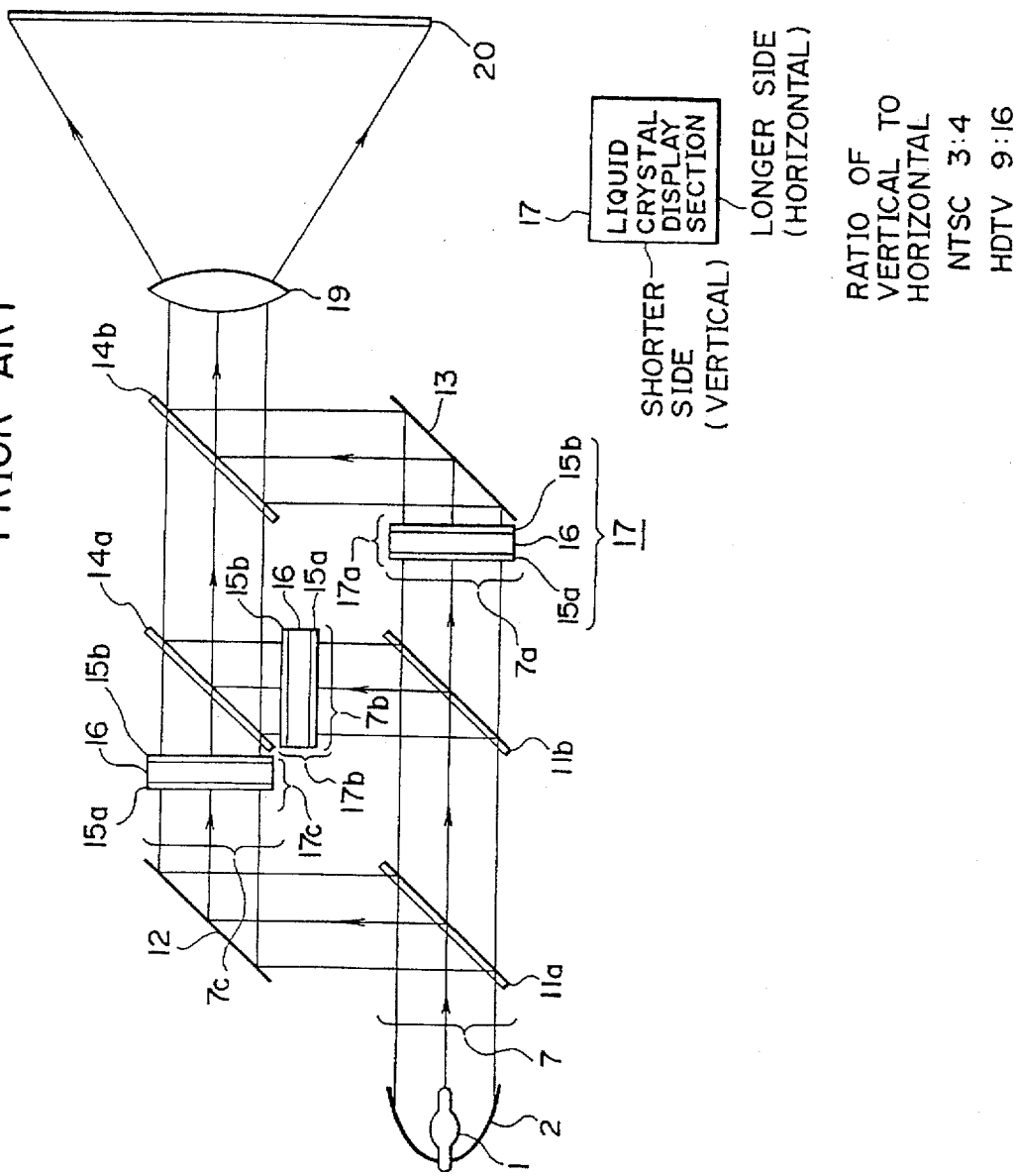

FIG. 10 is a view of a projection type display apparatus constructed in accordance with the prior art, comprising a source of natural light.

DETAILED DESCRIPTION OF THE PREFERRED EMBODIMENTS

Figure 1:
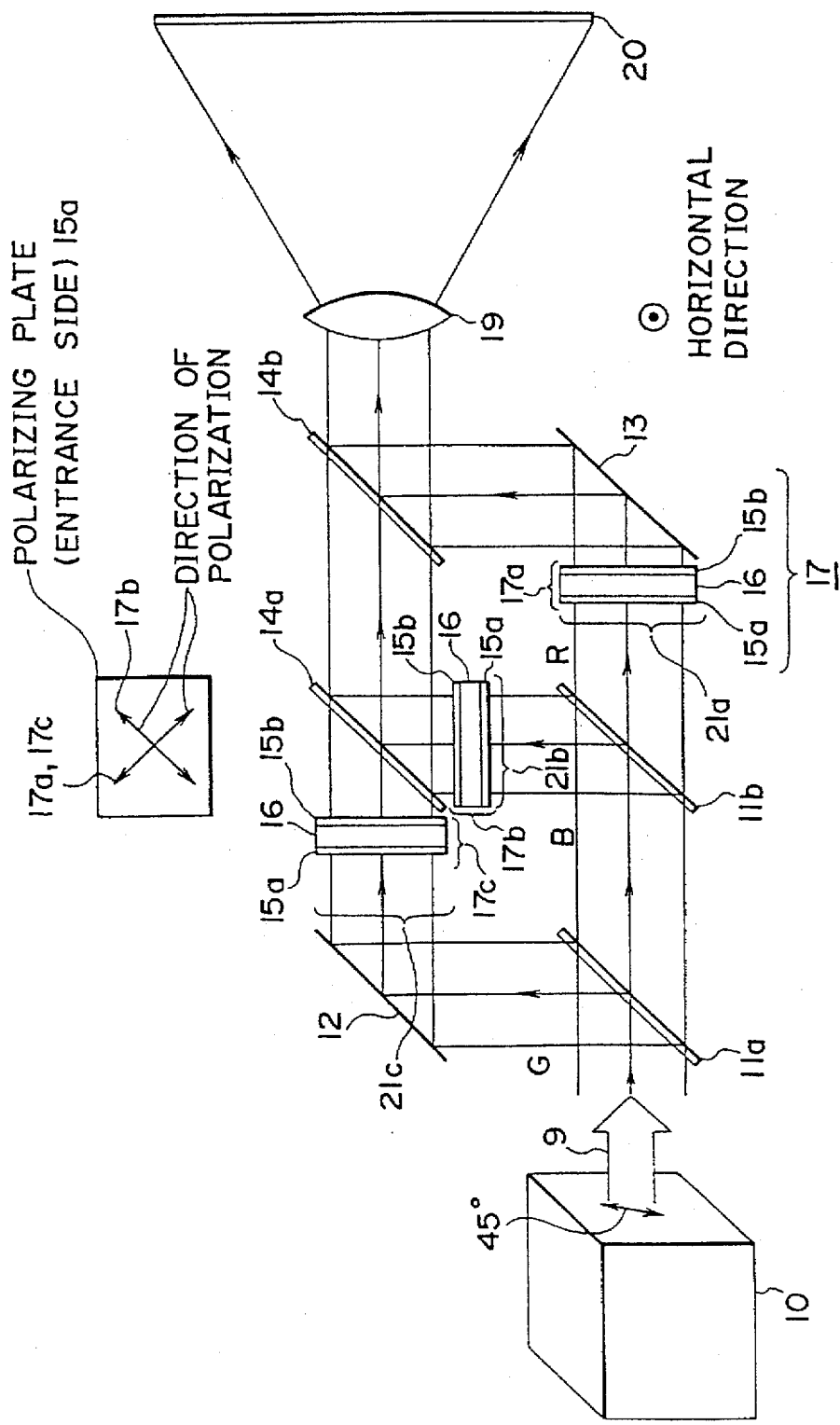
FIG. 1 is a view of one preferred embodiment of a projection type display apparatus constructed in accordance with the present invention, illustrating three liquid crystal display elements, at least one of which has an entrance-side polarizing plate with its polarizing angle different from those of the other polarizing plates.

Referring to FIG. 1, there is shown the first embodiment of a projection type display apparatus constructed in accordance with the present invention. The display apparatus comprises a source of linearly polarized light 10 which will be described in detail. Light rays 9 emitted from this light source 10 have a polarizing angle of 45 degrees relative to the horizontal direction. The light rays 9 are separated into light rays 21a, 21b and 21c of three colors R, G and B by dichroic mirrors 11a and 11b each of which is adapted to reflect only light rays ranged in a specific region of wavelength. Each of three colored light rays 21a, 21b and 21c illuminates the corresponding one of three liquid crystal display elements 17a, 17b and 17c. In general, each of the liquid crystal display elements 17 has an entrance-side polarizing plate 15a which has its direction of output wavefront equal to 45 degrees relative to the horizontal direction. The linearly polarized light rays 9 from the source 10 are reflected zero and two times (even times) by mirror means on the optical path until they reach the liquid crystal display elements 17a and 17c, respectively. On the other hand, the linearly polarized rays are reflected one time (odd times) by the mirror means until they reach the liquid crystal display element 17b. Depending on whether the number of reflections is even or odd, the direction of output wavefront is shifted by 90 degrees. If the linearly polarized light rays 9 from the source 10 run inclined leftwardly and upwardly with an angle of 45 degrees in the direction of progress as shown in FIG. 1, the light rays can pass through the liquid crystal display elements. Thus, each of the liquid crystal display elements 17a and 17c utilizes an entrance-side polarizing plate 15a having its direction of output wavefront which is the same as said polarizing angle, that is, inclined leftwardly and upwardly with an angle of 45 degrees.

The present invention is characterized by that the entrance-side polarizing plate of the liquid crystal display element 17b has its direction of output wavefront inclined rightwardly and upwardly with an angle of 45 degrees unlike those of the liquid crystal display elements 17a and 17c, since the illuminating rays 21b is different in direction of output wavefront from the other illuminating rays 21a and 21c by 90 degrees.

In the first embodiment, thus, the illuminating rays 9 pass through the two dichroic mirrors 11a and 11b. For example, the liquid crystal display element 17a will be illuminated by light components of red color R. The light components R is not reflected by any mirror on the optical path and thus have a polarizing angle inclined leftwardly and upwardly by 45 degrees as emitted from the source 10. As mentioned, the entrance-side polarizing plate 15a of each of the liquid crystal display elements 17 has its direction of output wavefront inclined leftwardly and upwardly by 45 degrees. Therefore, the light components R can enter the liquid crystal display element 17a without loss.

On the other hand, light components G separated and reflected by the dichroic mirror 11a are further totally reflected by a total reflection mirror 12 to form illuminating rays 21c of green color which in turn enter the liquid crystal display element 17c. Since the polarizing angle of the blue-colored illuminating light rays 21b is mirror inverted with one reflection by the dichroic mirror 11b, it is different from that of the emitted light rays 10 from the light source by 90 degrees. Since the polarizing angle of the green-colored light rays 21c is mirror inverted two times with two reflections by the dichroic mirror 11a and total reflection mirror 12, it it the same as that of the emitted light rays 10 from the light source. Therefore, the illuminating rays 21c can also enter the liquid crystal display element 17c without any loss by the direction of output wavefront inclined leftwardly and upwardly by 45 degrees in the entrance-side polarizing plate 15a of the liquid crystal display element 17c, as aforementioned. In this embodiment, thus, the liquid crystal display elements 17a and 17c may be of the same structure.

After passed through the dichroic mirror 11a, the illuminating rays enter the next dichroic mirror 11b at which only the light components of blue color are reflected toward the third liquid crystal display element 17b. As described, the illuminating rays 21b of blue color have been polarized through 90 degrees by one reflection. The liquid crystal display element 17b is arranged with the entrance-side polarizing plate 15a thereof having its direction of output wavefront inclined rightwardly and upwardly by 45 degrees, as shown. Consequently, the illuminating rays 21b of blue color can enter the liquid crystal display element 17b without any loss.

In such a manner, the first embodiment can provide three liquid crystal display elements which the illuminating rays of red, green and blue colors can enter respectively without any loss, only by the fact that one of the liquid crystal display elements has its direction of output wavefront different from those of the other liquid crystal display elements.

Images of red, green and blue colors are then synthesized by the dichroic mirrors 14a and 14b to form a single light beam which is in turn enlarged and projected by the projecting lens 19 onto the screen 20.

It is of course to be understood that an image from the liquid crystal display element 17a is reflected toward the dichroic mirror 14b by the total reflection mirror 13.

Figure 2:
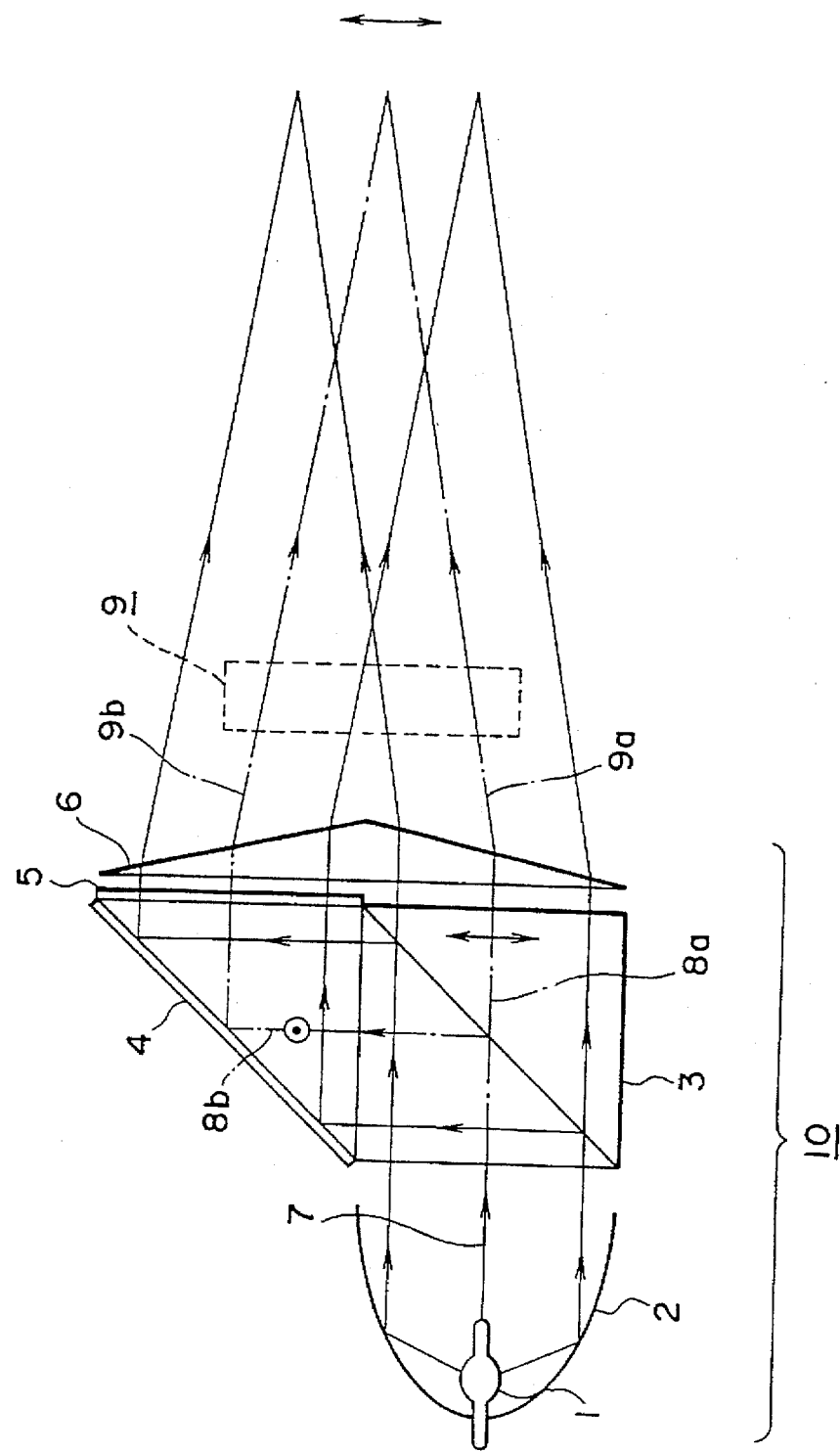
FIG. 2 is a view of one preferred source of light usable in the present invention to provide a linearly polarized light beam.

FIG. 2 shows the details of the light source 10 including an optical system which can convert the natural light into a linearly polarized light in a simple and efficient manner.

On operation, the light rays emitted from the light source 1 are converted into parallel rays 7 by the parabolic mirror 2. At a polarization beam splitter 3, the parallel rays 7 are separated into two linearly polarized lights including P-polarized light components 8a and S-polarized light components 8b. The directions of output wavefront in the P- and S-polarized light components 8a and 8b are different from each other through 90 degrees. After the S-polarized light components 8b have been deflected by the reflection mirror 4, the plane of polarization in the S-polarized light components 8b is rotated 90 degrees by the phase plate 5. It is appropriate that the retardation R of the phase plate 5 is equal to $\lambda/2$ for the center wavelength $\lambda$ in the plane of polarization to be rotated 90 degrees. The phase plate 5 is disposed to realize its optic axis inclined, through 45 degrees, relative to the direction of polarization in the S-polarized light components 8b. These light beams are then synthesized to form a light beam 9 by a wedge prism 6 or the like. The two light beams 9a and 9b are ones linearly polarized substantially in the same direction. The synthesized light beam 9 also is a linearly polarized beam which can illuminate the liquid crystal display elements 17 efficiently.

As will be apparent from the foregoing, the first embodiment can provide a high-luminance liquid crystal projector having a reduced light loss at the entrance-side polarizing plates by utilizing the illuminating light beams linearly polarized and by using three liquid crystal display elements, one of the liquid crystal display element having a polarizing plate with its direction of output wavefront different from those of the other liquid crystal display elements. This results in reduction of heat which would be generated at the entrance-side polarizing plates due to light loss, leading to prevention of degradation in the polarization.

Figure 3:
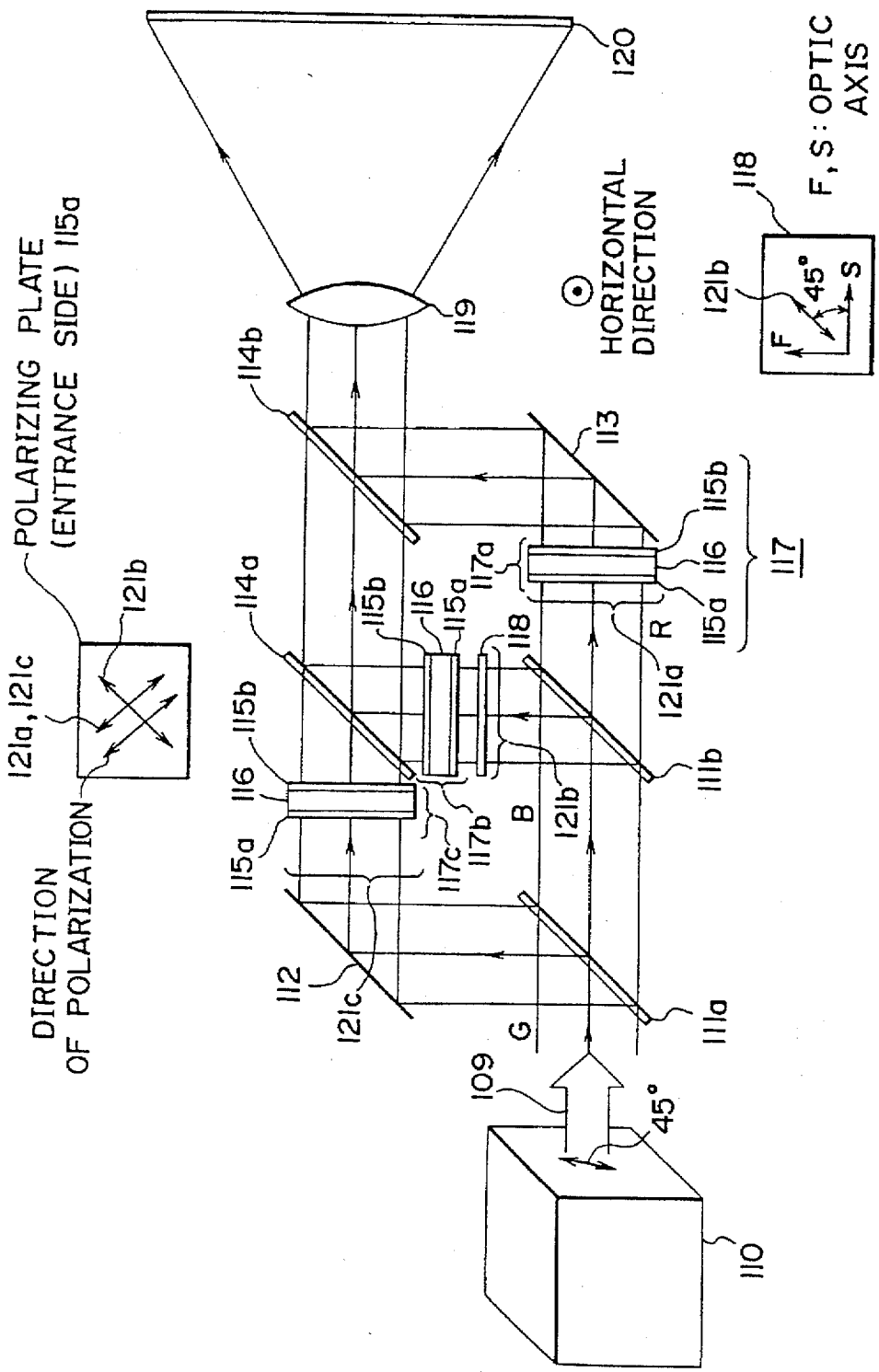
FIG. 3 is a view of another preferred embodiment of a projection type display apparatus constructed in accordance with the present invention, illustrating a phase plate which is disposed before at least one of three liquid crystal display elements.

FIG. 3 shows the second preferred embodiment of a projection type display apparatus constructed in accordance with the present invention, in which parts similar to those of FIG. 1 are designated by similar reference numerals added by 100 and will not be further described.

The second embodiment is characterized by that three liquid crystal display elements for receiving illuminating rays of red, green and blue colors are of the same structure and that any liquid crystal display element receiving illuminating rays having their direction of output wavefront different from those of the other illuminating rays is arranged with the entrance-side polarizing plate thereof located behind a phase plate for rotating the plane of polarization.

In general, the direction of output wavefront in the entrance-side polarizing plate 115a of a liquid crystal display element 117 is inclined 45 degrees relative to the horizontal direction.

Three liquid crystal display elements 117a, 117b and 117c shown in FIG. 3 are of the same structure, these entrance-side polarizing plates having the direction of output wavefront inclined 45 degrees leftwardly and upwardly as viewed from the entrance side of illuminating rays.

Linearly polarized light 109 emitted from a source of light 110 and inclined 45 degrees relative to the horizontal direction is reflected zero and two times (even times) respectively until it reaches the liquid crystal display elements 117a and 117c and one time (or odd times) until the light reaches the liquid crystal display element 117b. Depending on whether the reflections are even or odd, the direction of output wavefront will be varied by 90 degrees. If the plane of polarization in the linearly polarized light 109 from the light source 110 is inclined 45 degrees leftwardly and upwardly as shown in FIG. 3, the directions of output wavefront in the entrance-side polarizing plates 115a of the liquid crystal display elements 117a and 117c is coincide with that of the illuminating rays 121a and 121c, but different from that of the liquid crystal display element 117b by 90 degrees.

In the second embodiment, a phase plate 118 is used for the light rays entering the liquid crystal display element 117b such that the direction of output wavefront in the illuminating rays 121b will be rotated 90 degrees. It is appropriate that the phase plate 118 is an element having a phase difference between two optic axes F and S perpendicular to each other in the plane of the element, the phase difference being equal to λ/2 for the desired light wavelength λ. The optic axis of the phase plate 118 is disposed making 45 degrees relative to the direction of output wavefront in the incident light.

In the second embodiment, thus, the three liquid crystal display elements illuminated by the light beams of red, green and blue colors can be of the same structure by positioning the phase plate 118 before one liquid crystal display element having its plane of polarization different from those of the other liquid crystal display elements. Images of red, green and blue colors can be provided by a simplified structure without any specific element.

In order to provide a linearly polarized light 109 from the light source 110, the light having, for example, its polarizing angle inclined 45 degrees relative to the horizontal direction, the second embodiment may utilize a source of light formed by combining P- and S-polarizations as in the first embodiment described in connection with FIG. 2.

However, it may be possible that the system of FIG. 2 varies spectrum due to the optical characteristics of the phase plate. Variations of spectrum result from a wavelength dependency in a phase difference between fast and slow phase axes in the phase plate. In accordance with such a wavelength dependency, the polarization of the transmitted light depends on wavelength when the linearly polarized light is incident on the phase plate. As the transmitted light enters the polarizing plate, the intensity of the transmitted light depends on wavelength since the elliptically polarized light is subjected to loss at the polarizing plate. The characteristic of the transmitted light when the phase plate is sandwiched between the polarizing plates perpendicular to each other is represented by:

$$I = I_0 \sin^2 \delta \qquad (1)$$

$$\delta = \pi R / \lambda \qquad (2)$$

where $I_0$: Intensity of light incident on the phase plate;
I: Intensity of light transmitted through the polarizing plate;
R: Retardation of the phase plate; and
λ: Wavelength.

The phase difference φ produced at the phase plate is represented by:

$$\phi = 2\pi R / \lambda \qquad (3)$$

Figure 4:
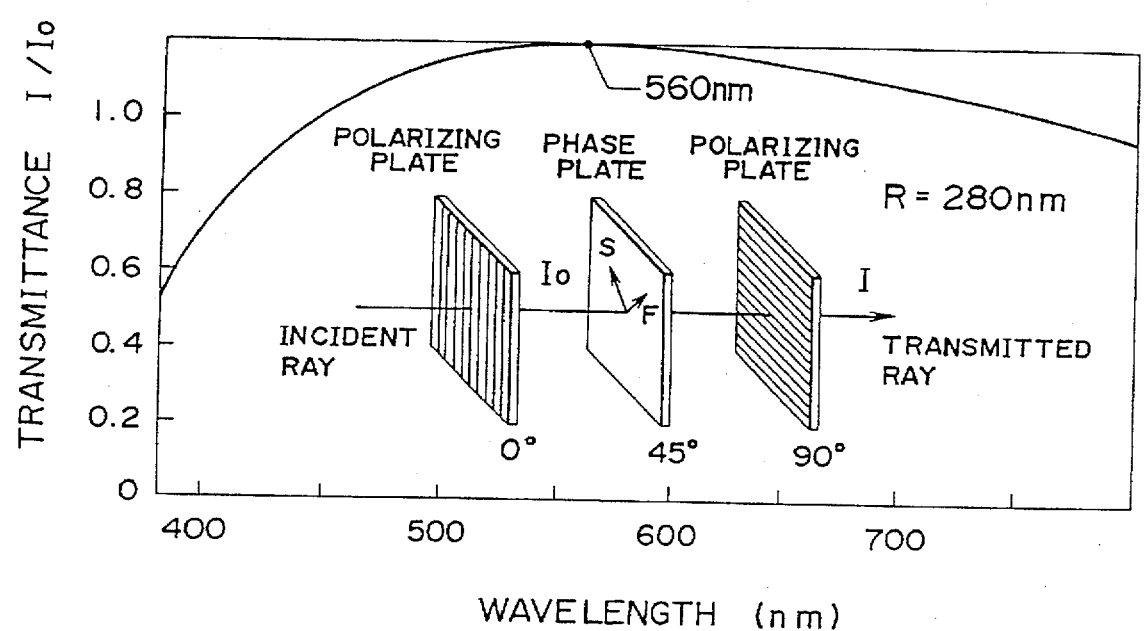
FIG. 4 is a graph illustrating the relationship between light source wavelength and transmittance, which is required to provide a linearly polarized light beam in the present invention.

FIG. 4 exemplifies a calculation of the spectral transmittance in a phase plate (having its retardation R equal to 280 nm) which is sandwiched between two polarizing plates perpendicular to each other. In order to prevent the reduction of luminance, it is desirable to utilize a phase plate having a high transmittance for the wavelength region of green color. However, this provides an increased loss in the short wavelength region as shown in FIG. 4. The light beam 8b of FIG. 2 passes through two phase plates 5 and 118 until it reaches the liquid crystal display element 117b shown in FIG. 3. In order to reduce the variation of spectrum, it is thus desirable to arrange the two phase plates 5 and 118 with their optic axes being opposite to each other in direction.

Figures 5A, 5B:
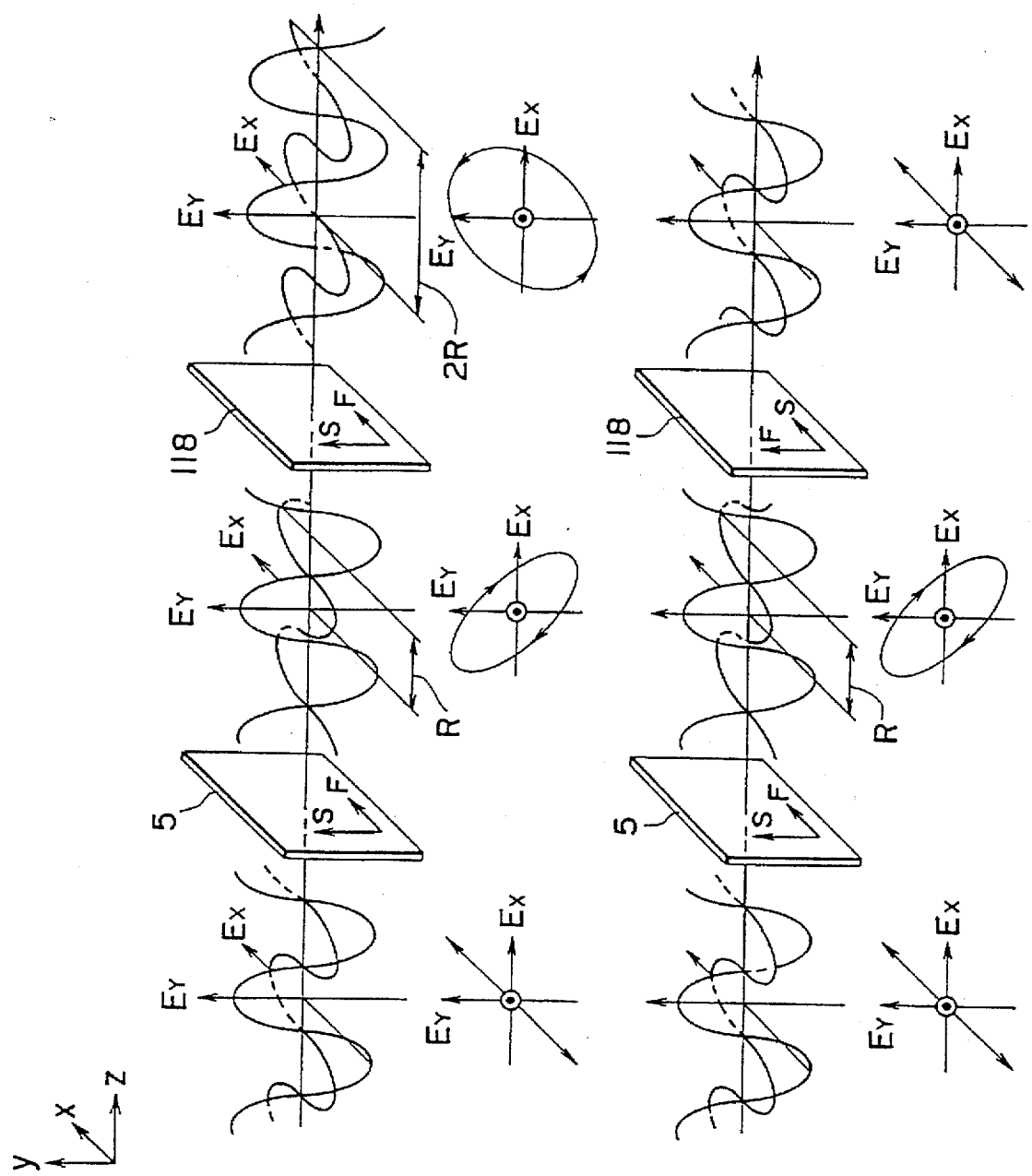
FIGS. 5a and 5b illustrate variations of the phase in the light beam when it passes through the phase plater of the second embodiment and a phase plate in the light source.

FIG. 5 illustrates variations of phase in a light beam under a condition, λ≠2R (the phase difference between the optic axes F and S being out of the aforementioned condition, λ/2). In FIG. 5, a letter F designates a fast phase axis while a letter S denotes a slow phase axis. As seen from FIG. 5(a), light transmitted through the first phase plate 5 becomes an elliptically polarized light since the phase difference φ between the F-axis and S-axis components is out of the equation ③ by π (½ wavelength). If the optic axis of the phase plate 5 is coincide with that of the phase plate 118, there is a phase difference, φ≠2π between the light transmitted through the second phase plate 118 and the light incident on the first phase plate 5. Thus, the light transmitted through the phase plate 118 is an elliptically polarized light which is subject to light loss due to selection of polarization in the entrance-side polarizing plate of the liquid crystal display element 117b. This reduces the intensity of the transmitted light.

As shown in FIG. 5(b), if the phase plates 5 and 118 have their optic axes opposite to each other in direction, the F-axis component advanced from the S-axis component will be delayed at the second phase plate 118. The transmitted light becomes a linearly polarized light under a phase difference φ=0, resulting in reduction of the intensity of the transmitted light. This is because the system consisting of the phase plates 5 and 118 acts as if it is an optical isotropy substrate.

Figure 6:
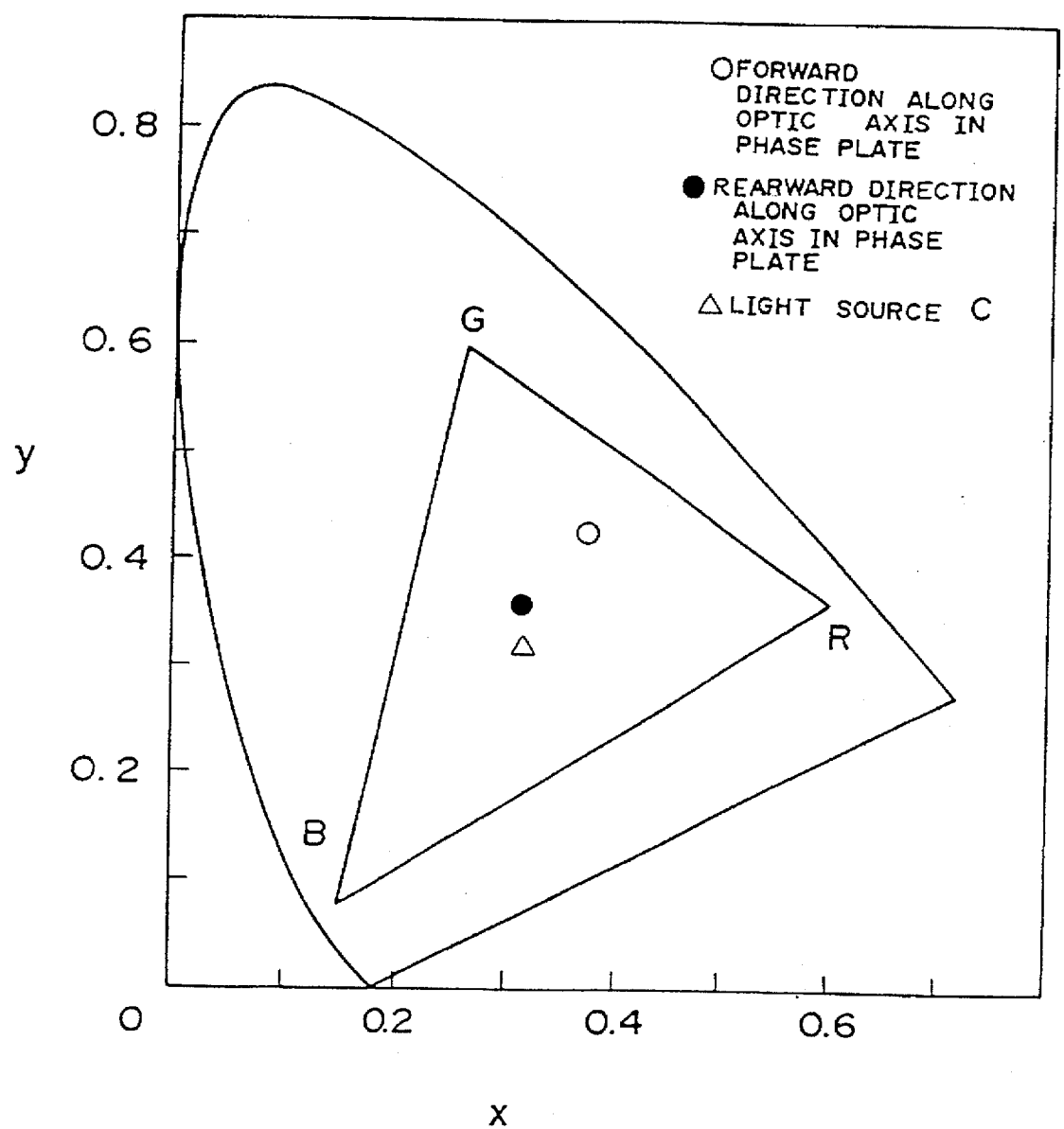
FIG. 6 is a graph showing measurements for the chromaticity in a liquid crystal projector constructed according to the present invention.

FIG. 6 shows measurements for chromaticity in the liquid crystal projector. The chromaticity measured herein is for the liquid crystal display element 117b which is set to display the blue color in FIG. 3.

If the optic axes of the phase plates are in the same direction, loss in the blue color is very large and highly out of the coordinates of chromaticity in the source of light C (reference white color in the NTSC system). However, the transmitted light can approach a preferred white color if the optic axes of the phase plates are in the opposite directions.

Figure 7:
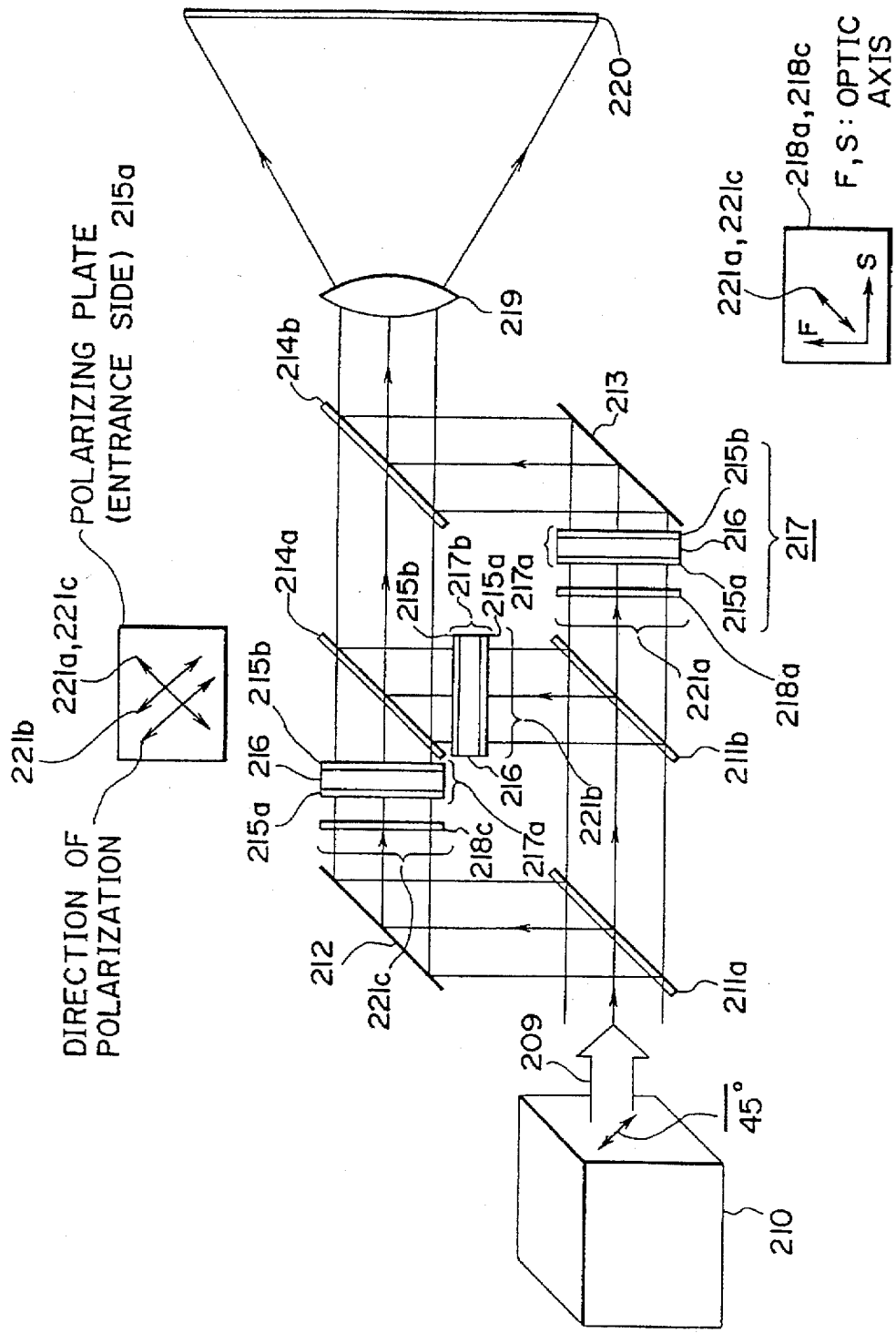
FIG. 7 is a view of the third preferred embodiment of a projection type display apparatus constructed in accordance with the present invention, illustrating two phase plates which are disposed respectively before two liquid crystal display elements among three liquid crystal display elements used therein.

FIG. 7 shows the third embodiment of a projection type display apparatus constructed in accordance with the present invention. This third embodiment utilizes a phase plate for adjusting the direction of output wavefront in the light beam incident on a liquid crystal display element. In FIG. 7, parts similar to those of the second embodiment shown in FIG. 3 are designated by similar reference numerals added by 200 and will not be further described.

As seen from FIG. 7, the direction of output wavefront in an illuminating light 209 is inclined rightwardly and upwardly by 45 degrees as opposite to the second embodiment shown in FIG. 3. In addition, the entrance-side polarizing plate of each of liquid crystal display elements 217a, 217b and 217c has a direction of output wavefront inclined leftwardly and upwardly by 45 degrees. The entrance-side polarizing plate 215b of the liquid crystal display element 217b has a direction of output wavefront which is in the same direction as that of the illuminating light 221b. The direction of output wavefront in the polarizing plate 215a of each of the liquid crystal display elements 217a and 217c is angularly different from those of the illuminating lights 221a and 221c by 90 degrees. It is thus required that the planes of polarization in the illuminating lights are rotated through 90 degrees. For such a purpose, phase plates 218a and 218c are disposed before the liquid crystal display elements 217a and 217c. The other structural components are similar to those of the second embodiment.

As will be apparent from the foregoing, the second and third embodiments utilize such a structure that utilizes linearly polarized rays as illuminating rays in the liquid crystal projector and includes three liquid crystal display elements, one or two of these liquid crystal display elements being disposed behind a phase plate or phase plates. Since the system is defined by the three liquid crystal display elements of the same structure, it may be manufactured with a reduced cost.

FIG. 8 shows the fourth embodiment of a projection type display apparatus constructed in accordance with the present invention. Unlike the previous embodiments, the fourth embodiment utilizes three liquid crystal display elements each of which has an entrance-side polarizing plate having a horizontal direction of output wavefront. Correspondingly, illuminating rays emitted from a source of light also are set to be horizontal. Even though the polarizing angle is varied due to mirror reflection in the optical path, thus, the plane of polarization in the light incident on each of the liquid crystal display elements may be maintained horizontal, irrespective of the number of reflections (even or odd).

The fourth embodiment is of a structure similar to that of the first embodiment shown in FIG. 1. Parts similar to those of the first embodiment are designated by similar reference numerals added by 300 and will not be further described.

The entrance-side polarizing plate of each of three liquid crystal display elements 317a, 317b and 317c has a direction of output wavefront parallel to the longitudinal axis of a rectangular display face. A source of light 310 emits an illuminating light beam 309 linearly polarized to have a direction of output wavefront which is coincide with that of the entrance-side polarizing plate.

Where the liquid crystal display elements of the first to third embodiments each having a direction of output wavefront inclined 45 degrees relative to the horizontal direction are combined with an illuminating unit for emitting an illuminating beam having a direction of output wavefront inclined 45 degrees relative to the horizontal direction, it is required to utilize one liquid crystal display element having an entrance-side polarizing plate with its direction of output wavefront different from those of the other liquid crystal display elements by 90 degrees or to use means for rotating the plane of polarization in the illuminating beam.

In the arrangement shown in FIG. 8, three liquid crystal display elements may be of the same structure without any means for rotating the plane of polarization.

Images of red, green and blue colors are synthesized by dichroic mirrors 314a and 314b to form a light beam which is then enlarged and projected by a projecting lens 319 onto a screen 320.

The fourth embodiment can eliminate any phase plate which would be required in the previous embodiments, by providing three liquid crystal display elements and illuminating beam, the directions of output wavefront of which are set to be horizontal. Instead, the fourth embodiment may use three polarizing plates having the same direction of polarization.

It is preferable that the light source 310 providing such a horizontal direction of output wavefront is a linearly polarized light source performing P- and S-polarizations shown in the first embodiment of FIG. 2.

FIG. 9 shows the fifth embodiment of a projection type display apparatus constructed in accordance with the present invention. The fifth embodiment is similar in construction to the fourth embodiment. Therefore, parts similar to those of the fourth embodiment are designated by similar reference numerals added by 400 and will not be further described.

The fifth embodiment is characterized by that the plane of polarization thereof is different from that of the fourth embodiment by 90 degrees. More particularly, the fourth embodiment utilizes three liquid crystal display elements and a light source, their polarizing angles being zero relative to the horizontal direction. On the other hand, the fifth embodiment utilizes all the polarizing angles which are perpendicular to the horizontal direction. In any event, the fourth and fifth embodiments do not require such phase plates as described in the second and third embodiments. Thus, the fourth and fifth embodiments may utilize an LCD which comprises three polarizing plates having the same direction of polarization.

Three liquid crystal display elements 417 are of the same structure in which the entrance-side polarizing plate 415a of each of the liquid crystal display elements 417 is perpendicular to the longitudinal direction in a rectangular display face. An illuminating light beam 409 is a linearly polarized light beam having a direction of output wavefront which is coincide with the direction of output wavefront in an entrance-side polarizing plate 415a. As in the projection type display apparatus of FIG. 8, the three liquid crystal display elements are of the same structure without need of any means for rotating the direction of output wavefront. The other advantages are the same as those of the fourth embodiment.

As will be apparent from the foregoing, the projection type display apparatus including an optical system for emitting a linearly polarized beam illuminating the liquid crystal display elements may be constructed with a reduced cost since these liquid crystal display elements are of the same structure. In addition, the entrance-side polarizing plates will be less heated to reduce the degradation in their properties by the use of the linearly polarized illumination beam. Since the lights subjected to P- and S-polarizations are synthesized within the light source 410, the system may be efficiently utilized with high-luminance images to be projected.

We claim:

1. A projection type display apparatus, comprising:

polarized light source means for generating light and converting the light into a first linearly polarized light to be outputted;

spectroscope means including dichroic mirror means for separating said first linearly polarized light into light rays of red, green and blue colors;

three liquid crystal display elements each of which permits the respective light rays of red, green and blue colors to pass therethrough, the transmittance of each pixel being controlled by a desired image signal, each of said liquid crystal display elements including a liquid crystal cell and a pair of polarizing plates disposed on opposite sides of said liquid crystal cell, said three liquid crystal display elements being of the same structure and outputting image-bearing light rays;

a phase plate disposed on the entrance side of a particular one or two of said three liquid crystal display elements, said phase plate being adapted to rotate the plane of polarization of said first linearly polarized light through 90 degrees; and a projecting lens for enlarging and projecting said image-bearing light rays.

2. The projection type display apparatus as defined in claim 1, wherein the first linearly polarized light emitted from said polarized light source means has a polarizing angle of 45 degrees formed relative to the horizontal direction and wherein the polarizing plates disposed on opposite sides of said liquid crystal cell are such that two of said three liquid crystal display elements each has an entrance-side polarizing plate having the same polarizing angle as that of said first linearly polarized light beam, the remaining one of said liquid crystal display elements having an entrance-side polarizing plate with a polarizing angle different from those of the other two entrance-side polarizing plates by 90 degrees.

3. The projecting type display apparatus as defined in claim 1, said polarized light source means including:

a source of light emitting light rays;

a parabolic mirror for converting said light rays into parallel rays;

a polarization beam splitter for separating said parallel rays into a second and third linearly polarized lights;

a reflecting mirror for deflecting one of said second or third linearly polarized lights;

a phase plate for rotating the plane of polarization of the deflected second or third linearly polarized lights through 90 degrees; and a prism for synthesizing said second and third linearly polarized lights into said first linearly polarized light.

4. The projecting type display apparatus as defined in claim 3, wherein the phase plate in said polarized light source means has an optic axis extending in the opposite direction to that of the phase plate disposed on the entrance side of the liquid crystal display element.

5. A projection type display apparatus, comprising:

a polarized light source for emitting a third linearly polarized light composed of a first and a second linearly polarized lights, including light converging means for converging exit light rays from a lamp and converting the exit light rays into forward exit light rays;

polarization beam splitter means for separating the forward exit light rays into first and second linearly polarized lights;

deflection means for deflecting one of the first or second linearly polarized lights to a direction substantially the same as that of the other linearly polarized light; and a first polarized light rotation means including a first phase plate for rotating the polarization direction of one of the first or second linearly polarized lights through 90 degrees;

spectroscope means including a dichroic mirror for separating a third linearly polarized light emitted from said polarized light source into red, green, and blue light rays;

image display elements for performing light modulation in response to an image signal of red, green, or blue color, said image crystal display elements including first and second polarizing plates and a liquid crystal cell interposed between said first and second polarizing plates;

second polarized light rotation means including a second phase plate for rotating the polarization direction of the third linearly polarized light through 90 degrees such that the polarization direction of the third linearly polarized light is made to coincide with that of said first polarizing plate, said second phase plate being arranged with an optical axis of the second phase plate being opposite to the optical axis of the first phase plate in direction; and a projection lens for enlarging and projecting an image from said image display elements.

* * * * *